United States Patent
Wang

(10) Patent No.: US 8,780,514 B2
(45) Date of Patent: Jul. 15, 2014

(54) DATA CABLE AND ELECTRONIC DEVICE USING SAME

(71) Applicant: Yin-Zhan Wang, Shenzhen (CN)

(72) Inventor: Yin-Zhan Wang, Shenzhen (CN)

(73) Assignees: Fu Tai Hua Industry (Shenzhen) Co., Ltd., Shenzhen (CN); Hon Hai Precision Industry Co., Ltd., New Taipei (TW)

(*) Notice: Subject to any disclaimer, the term of this patent is extended or adjusted under 35 U.S.C. 154(b) by 1 day.

(21) Appl. No.: 13/681,373

(22) Filed: Nov. 19, 2012

(65) Prior Publication Data

US 2013/0155559 A1 Jun. 20, 2013

(30) Foreign Application Priority Data

Dec. 17, 2011 (CN) .......................... 2011 1 0423664

(51) Int. Cl.
*H02H 3/00* (2006.01)
(52) U.S. Cl.
USPC .............................. 361/86; 361/42

(58) Field of Classification Search
USPC ................................. 361/42–50, 86
See application file for complete search history.

(56) References Cited

U.S. PATENT DOCUMENTS 5,691,702 A * 11/1997 Hay ............................... 340/626
2008/0119246 A1 * 5/2008 Kang et al. ................. 455/575.1

* cited by examiner

*Primary Examiner* — Danny Nguyen
(74) *Attorney, Agent, or Firm* — Novak Druce Connolly Bove + Quigg LLP

(57) ABSTRACT

A data cable between two electronic devices includes a first interface comprising a first metal shell and a ground end; and a second interface connected to another electronic device comprising a second metal shell, a ground end and an identification end. The data cable includes a detection circuit detecting voltage difference between the first metal shell and the ground end, and the detection circuit comprises an output end connected to the identification end of the second interface. An electronic device using the data cable detects any current leakage in an external electronic device. When the host has current leakage, the electronic device cuts power from the host and prevents data exchange, preventing damage or loss.

15 Claims, 2 Drawing Sheets

DATA CABLE AND ELECTRONIC DEVICE USING SAME

BACKGROUND

1. Technical Field

The present disclosure relates to a data cable, and more particularly to a data cable that detects current leakage and an electronic device using the data cable.

2. Description of Related Art

Personal computers and notebooks are widely used. The computer and notebook have a plurality of interfaces for connecting to various other electronic devices, such as mobile phones, personal digital assistants (PDAs), and tablet computers, to exchange data therebetween via cables. Over time, a ground contact of the computer deteriorates, thereby causing current leakage or at least a reduction in the quality of the data exchange. External electronic devices connected to the computer via the data cables may be damaged by the current leakage, or may even give an electric shock to a user.

Therefore, an electronic device using a data cable that detects current leakage is desired.

BRIEF DESCRIPTION OF THE DRAWINGS

The components in the drawing are not drawn to scale, the emphasis instead being placed upon clearly illustrating the principles of at least one embodiment.

DETAILED DESCRIPTION

Figure 1:
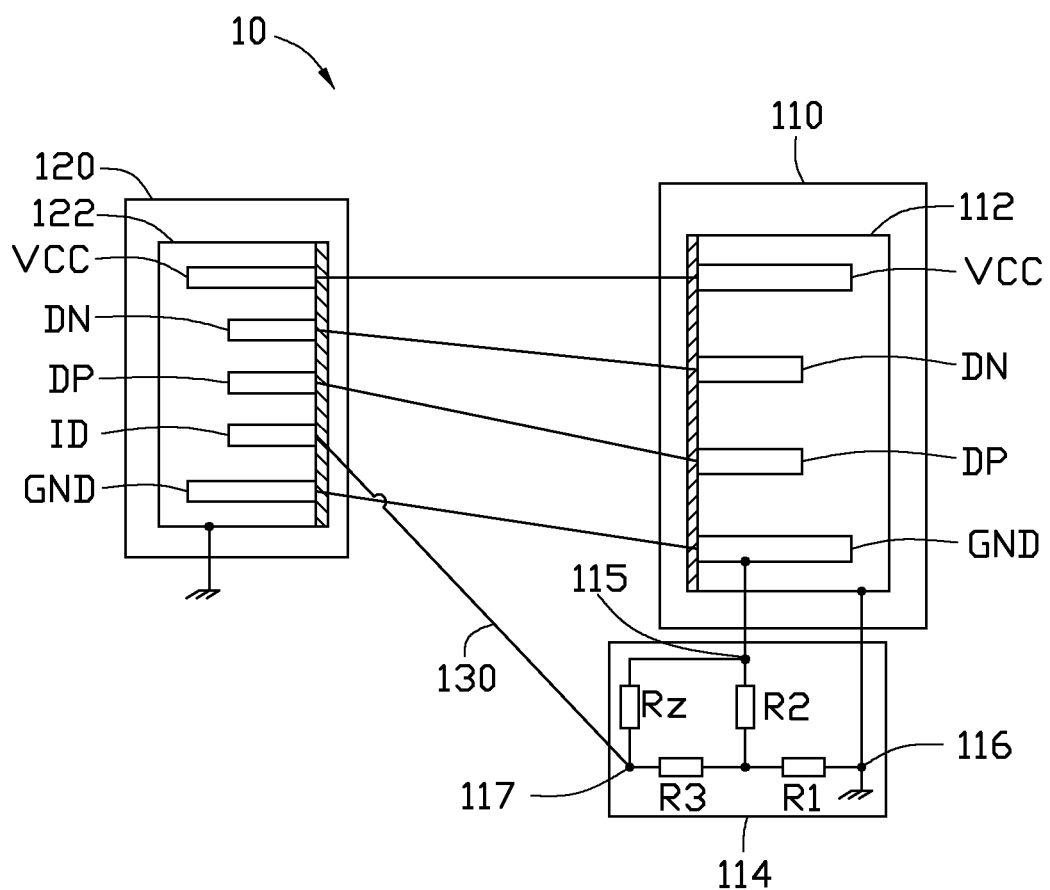
FIG. 1 is a block diagram of a data cable according to an exemplary embodiment of the present disclosure.

Reference will be made to the drawing to describe various embodiments.

FIG. 1 illustrates a block diagram of a data cable 10 in a first embodiment of the present disclosure. The data cable 10 physically connects a first connector interface of an electronic device to a second connector interface of another electronic device, and the data cable 10 can be selectively connected or disconnected, to create or to remove a data exchange channel between the two electronic devices. The electronic device having the first connector interface can be for example the host (i.e. the host 30, see FIG. 2), capable of connecting to other electronic devices, each employing the second connector interface. These other electronic devices may be a mobile phone, a tablet computer, an MP3 player or other external electronic device. In the present disclosure, the electronic device is, for example, a server, a computer, or a television.

The data cable 10 includes a first interface 110 and a second interface 120. The first interface 110 includes a first metal shell 112, a first power end VCC, a first ground end GND, and two first data ends DN and DP. The first power end VCC, first ground end GND and the first data ends DN and DP are fixed in the first metal shell 112 of the first interface 110 with an insulating material such as rubber or plastic. The second interface 120 includes a second metal shell 122, a second power end VCC, a second ground end GND, two data ends labeled as DN and DP and an identification end ID. The second power VCC, the second ground end GND, the data ends DN and DP and the identification end ID of the second interface 120 are also fixed in the second metal shell 122 by an insulating material. The first power end VCC, the first ground end GND and the first data ends DN and DP of the first interface 110 connect to the second power end VCC, the second ground end GND, and the second data ends DN and DP of the second interface 120 respectively, thus forming a power line, a ground line and two data lines.

The data cable 10 further includes a detection circuit 114 embedded in the first interface 110. The detection circuit 114 includes a first end 115, a second end 116 and an output end 117. The first end 115 is electrically connected to the first metal shell 112 of the first interface 110. The second end 116 is electrically connected to the ground end GND of the first interface 110. The output end 117 is electrically connected to the identification end ID of the second interface 120 via a wire 130. In the embodiment, the connection between the first end 115 and the first metal shell 112 can be made by placing a metal portion of the first end 115 in contact with the metal shell 112. The detection circuit 114 further includes a first resistor R1, a second resistor R2, a current limiting resistor R3 and a piezo-resistor Rz. The first metal shell 112 is electrically connected to the first ground end GND of the first interface 110 via the first resistor R1 and the second resistor R2 in that order. A node of a connecting wire between the first resistor R1 and the second resistor R2 is electrically connected to the identification end ID of the second interface 120 via the current limiting resistor R3, through the wire 130 in the data cable. The piezo-resistor Rz is connected between the node and the first ground end GND, and limits a voltage applied on the identification end ID of the second interface 120 not to exceed a predetermined voltage. In the embodiment, a resistance of the first resistor R1 is greater than that of the second resistor R2.

Figure 2:
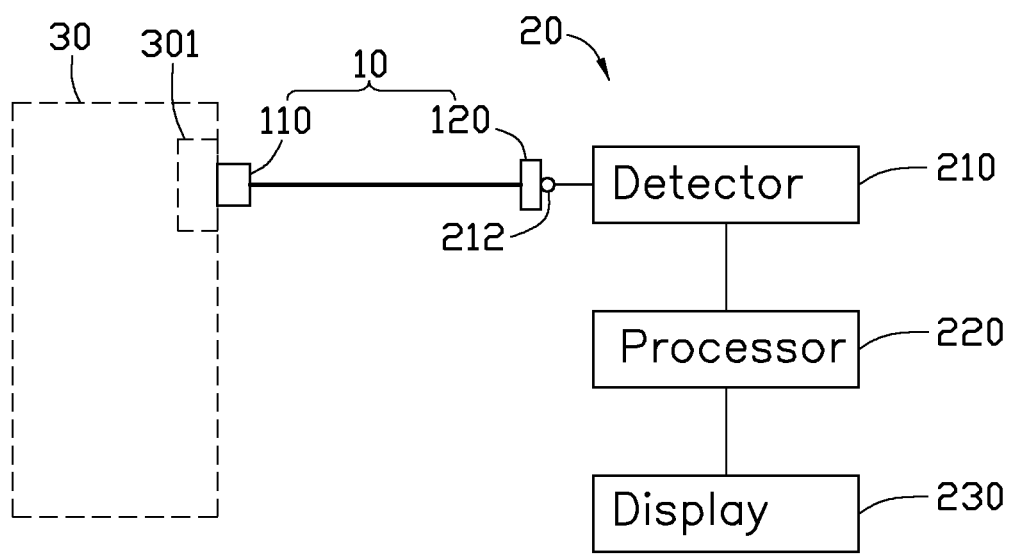
FIG. 2 is a block diagram of a host connecting to an electronic device via the data cable of FIG. 1.

Referring also to FIG. 2, a connection between the host 30 and an electronic device 20 via the data cable 10 of FIG. 1 is shown. The first interface 110 is connected to a first connector interface 301 of the host 30. In the embodiment, the first connector interface 301 can be for example a female USB interface, or a female HDMI interface positioned on a motherboard of the host 30. Accordingly, the first interface 110 can be a male USB interface or a male HDMI interface. The second interface 120 is connected to the second connector interface of the electronic device 20. In the embodiment, the second connector interface can be for example a male Mini USB interface or a male DVI interface embedded in the electronic device 20. Accordingly, the second interface 120 can be a female mini USB interface or a female DVI interface. The host 30 can supply power for the electronic device 20 via the power line and the ground line of the data cable 10. Data can be transmitted between the host 30 and the electronic device 20 via the two data lines.

When the first connector interface 301 of the host 30 is connected to the second connector interface of the electronic device 20 via the data cable 10, the metal shell 112 of the first interface 110 is connected to ground via a ground wire of the host power cable and an external chassis of the host 30 is also connected to the ground wire of the host power cable. The ground end GND of the first interface 110 connects to a ground terminal of motherboard. A voltage difference between the metal shell 112 and the ground end GND of the first interface 110 indicates whether there is current leakage between the motherboard and the external chassis.

The detection circuit 114 detects any voltage difference between the metal shell 112 and the ground end GND of the first interface 110.

The electronic device 20 having the second connector interface further includes a detector 210, a processor 220 and a display 230. The detector 210 includes a signal input end 212 electrically connected to the identification end ID of the second interface 120. The signal input end 212 receives a signal from the identification end ID.

The detector 210 sends the signal to the processor 220. The processor 220 determines whether the signal is logic high (e.g., logic 1, a first signal) or logic low signal (e.g., logic 0, a second signal). The display 230 displays any current leakage information of the host 30.

In operation, when the processor 220 determines that the signal from the identification end ID is a first signal, the processor 220 cuts the power supply from the host and prevents data exchange between the host 30 and the electronic device 20. The display 230 displays information indicating a current leakage in the form of a warning to the user. In the embodiment, the first signal is a logic high signal.

When the processor 220 determines that the signal is a second signal from the identification end ID, the processor 220 determines that no voltage difference exists between the first metal shell 112 and the ground end GND of the first interface 110, and the processor 220 allows normal data exchange between the host 30 and the electronic device 20. In the embodiment, the second signal is a logic low signal.

The electronic device 20 using the data cable 10 detects if there is current leakage in the host 30. When the host 30 has current leakage, the electronic device 20 cuts power from the host and prevents data exchange, so as to prevent loss or damage.

It is to be understood that even though numerous characteristics and advantages of the present embodiments have been set forth in the foregoing description, together with details of the structures and functions of the embodiments, the disclosure is illustrative only; and changes may be made in detail, especially in the matters of arrangement of parts within the principles of the embodiments, to the full extent indicated by the broad general meaning of the terms in which the appended claims are expressed.

What is claimed is:

1. A data cable electronically connected between a first electronic device and a second electronic device, comprising:
   a first interface configured to connect with a corresponding interface of the first electronic device, the first interface comprising a first metal shell and a ground end;
   a second interface configured to connect with a corresponding interface of the second electronic device, the second interface comprising a second metal shell, a ground end and an identification end;
   a detection circuit configured to detect a voltage difference between the first metal shell and the ground end of the first interface; the detection circuit comprising a first end connected to the first metal shell of the first interface, a second end connected to the ground end of the first interface, and an output end connected to the identification end of the second interface, when a voltage difference is generated between the first metal shell and the ground end, the detection circuit outputs a signal via the output end; the data between the first electronic device and the second electronic device selectively enabled or disabled according to the signal.

2. The data cable of claim 1, wherein the first interface and the second interface each comprise a power end and two data ends; the power end, the ground end and two data ends of the first interface correspondingly connect to the power end, ground end, and two data ends of the second interface via a power line, a ground line and two data lines respectively.

3. The data cable of claim 1, wherein the detection circuit is embedded in the first interface.

4. The data cable of claim 1, wherein the detection circuit comprises a first resistor and a second resistor, the first metal shell of the first interface is electrically connected to the ground end via the first resistor and the second resistor in series, and a node between the first resistor and the second resistor is connected to the identification end of the second interface.

5. The data cable of claim 4, wherein a resistance of the first resistor is greater than a resistance of the second resistor.

6. The data cable of claim 4, wherein the detection circuit further comprises a current limiting resistor; a node between the first resistor and the second resistor electrically connected to the identification end of the second interface via the current limiting resistor.

7. The data cable of claim 2, wherein the detection circuit further comprises a piezo-resistor, and the ground end of the first interface is electrically connected to the identification end of the second interface via the piezo-resistor.

8. An electronic device, comprising:
   a data cable electronically connected between the electronic device and an external electronic device, the data cable comprising:
   a first interface configured to be connected with a corresponding interface of the electronic device, the first interface comprising a first metal shell and a ground end;
   a second interface configured to be connected with a corresponding interface of the external electronic device, the second interface comprising a second metal shell, a ground end and an identification end; and
   a detection circuit configured to detect a voltage difference between the first metal shell and the ground end of the first interface, and transmit a detection signal according to detection of the voltage difference to the identification end of the second interface;
   a detector configured to receive the detection signal from the identification end of the second interface;
   a processor configured to determine whether voltage difference is generated according to the detection signal between the first metal shell and the ground end of the first interface; and
   a display configured to display current leakage information of one of two electronic devices when the processor determines that the voltage difference is generated between the first metal shell and the ground end of the first interface.

9. The electronic device of claim 8, wherein the first interface and the second interface each comprise a power end and two data ends, and the power end, ground end and two data ends of the first interface correspondingly connect to the power end, the ground end, and two data ends of the second interface via a power line, a ground line and two data lines respectively.

10. The electronic device of claim 9, wherein the detection circuit comprises a first resistor and a second resistor, the first metal shell of the first interface is electrically connected to the ground end via the first resistor and the second resistor in series, and a node between the first resistor and the second resistor is connected to the identification end of the second interface.

11. The electronic device of claim 10, wherein the external electronic device supplies power for the electronic device via the power line and ground line of the data cable, and the external electronic device transmits data to the electronic device and reversely via the two data lines.

12. The electronic device of claim 11, wherein the detector receives the detection signal denoting the voltage difference is generated between the first metal shell and the ground end of the first interface, the processor cuts out a power supply from the external electronic device and forbids the data exchange between the external electronic device and the electronic device.

13. The electronic device of claim 12, wherein the detection signal is a logic high level signal.

14. The electronic device of claim 11, wherein the detector receives the detection signal denoting a voltage difference is not generated between the first metal shell and the ground end of the first interface, the processor normally controls data exchange between the external electronic device and the electronic device.

15. The electronic device of claim 14, wherein the detection signal is a logic low level signal.

* * * * *